No. 806,683. PATENTED DEC. 5, 1905.
N. D. LANGFORD.
SPADE.
APPLICATION FILED JULY 25, 1905.

Witnesses
Inventor
N. D. Langford
By Chandler & Chandler
Attorneys

UNITED STATES PATENT OFFICE.

NOAH D. LANGFORD, OF LUTON, IOWA.

SPADE.

No. 806,683.   Specification of Letters Patent.   Patented Dec. 5, 1905.

Application filed July 25, 1905. Serial No. 271,204.

*To all whom it may concern:*

Be it known that I, NOAH D. LANGFORD, a citizen of the United States, residing at Luton, in the county of Woodbury, State of Iowa, have invented certain new and useful Improvements in Spades; and I do hereby declare the following to be a full, clear, and exact description of the invention, such as will enable others skilled in the art to which it appertains to make and use the same.

This invention relates to spades, and more particularly to tiling-spades, and has for its object to provide a spade of this kind which will be strong and durable and which will include a bit detachable for sharpening or to permit of the attachment of other bits to the body portion of the spade.

Other objects and advantages will be apparent from the following specification, which describes an embodiment of the present invention.

Figure 1:
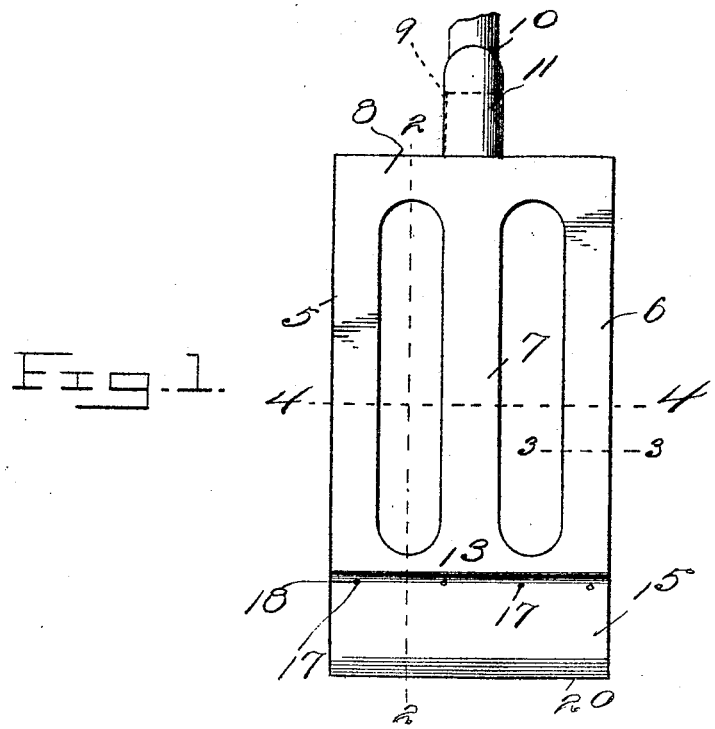
Figure 2:
Figure 4:
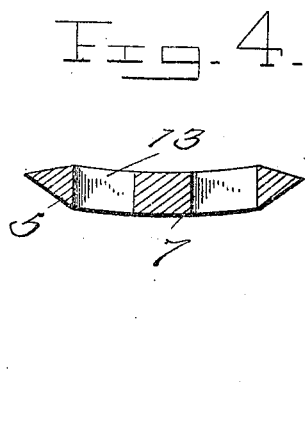
Figure 3:
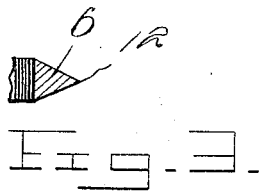

In the drawings forming a portion of this specification, and in which like numerals of reference indicate similar parts in the several views, Figure 1 is an elevation of the present spade. Fig. 2 is a longitudinal sectional view. Fig. 3 is a section on line 3 3 of Fig. 1. Fig. 4 is a transverse section on line 4 4 of Fig. 1.

Referring now to the drawings, the present invention comprises outer tines 5 and 6 and a central tine 7, the former lying in a plane forwardly of the latter, so that the three tines are disposed in a horizontally-extending arc. The tines are connected at their upper ends to a web 8, having an upwardly-extending socket 9 at its center adapted for the reception of a lower end of a handle 10, and at the forward and rearward portion of this socket there are upwardly-extending wings 11, which are secured to the handle.

The outer tines 5 and 6 are transversely triangular and have their apices 12 directed outwardly to form cutting edges, and at their lower ends the tines are connected by a web 13, which is laterally reduced to form a longitudinally-extending depending rib 14, this rib being transversely dovetail in shape and having its major end directed downwardly. A bit 15 is provided and has a longitudinally-extending dovetail groove 16 in its upper face, in which the rib 14 is removably engaged, and the bit is secured against accidental dis engagement by pins 17, passed through openings 18 in the bit and which aline with openings 19 in the rib 14. At its lower edge the bit is sharpened, as shown at 20, and it will be understood that bits of different shapes may be engaged with the rib 14 to suit different conditions and that the bits may be easily removed to permit of sharpening. As shown, the tines lie in spaced relation to each other to permit of the passage of water therebetween, so that matter excavated with the spade may be easily drained.

What is claimed is—

1. An implement of the class described comprising spaced vertical tines arranged in a horizontal arc, the outermost tines being transversely triangular and having their apices directed outwardly to present cutting edges, connecting-webs at the upper and lower ends of the tines, a socket carried by the upper web and having oppositely-disposed upwardly-extending wings formed thereupon, a handle engaged in the socket and lying between the wings, said wings being secured to the handle, said lower web being reduced laterally at its lower portion throughout its length to form a depending transversely-dovetail rib, the latter having its major portion directed downwardly, a bit having a sharpened lower edge, said bit having a dovetail groove in its upper face in which the rib is slidably engaged, and retaining devices removably engaged in the bit and in the rib.

2. A tiling-spade comprising spaced vertical tines arranged in a horizontal arc, the outermost tines having outwardly-directed cutting edges, connecting-webs at the ends of the tines, handle-attaching means carried by the upper web, a handle engaged with said means, the lower web being reduced laterally at its lower portion, a bit having portions resting against the reduced portion of the web, and retaining devices removably engaged in the bit and in the reduced portion of the web.

In testimony whereof I affix my signature in presence of two witnesses.

NOAH D. LANGFORD.

Witnesses:
B. F. CHANEY,
H. E. HOLLENBECK.